United States Patent
Yousif et al.

(10) Patent No.: US 8,832,229 B2
(45) Date of Patent: Sep. 9, 2014

(54) SYSTEM AND METHOD FOR USING A NETWORK FILE SYSTEM MOUNT FROM A REMOTE MANAGEMENT CARD

(75) Inventors: Alaa Yousif, Pflugerville, TX (US); Dung H. Nguyen, Austin, TX (US); Peter E. Perschbach, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 1351 days.

(21) Appl. No.: 11/381,629

(22) Filed: May 4, 2006

(65) Prior Publication Data

US 2007/0260606 A1 Nov. 8, 2007

(51) Int. Cl.
*G06F 15/16* (2006.01)
*G06F 15/177* (2006.01)
*G06F 9/00* (2006.01)

(52) U.S. Cl.
USPC .................... 709/218; 709/220; 713/1; 713/2

(58) Field of Classification Search
USPC .................................. 709/217–222, 227, 246
See application file for complete search history.

(56) References Cited

U.S. PATENT DOCUMENTS

| | | | |
|---|---|---|---|
| 5,737,523 A | 4/1998 | Callaghan et al. | 395/187.01 |
| 5,842,011 A * | 11/1998 | Basu | 713/2 |
| 5,974,547 A * | 10/1999 | Klimenko | 713/2 |
| 6,185,615 B1 | 2/2001 | Labiaga et al. | 709/224 |
| 6,493,824 B1 * | 12/2002 | Novoa et al. | 713/162 |
| 6,567,919 B1 * | 5/2003 | Yanagihara et al. | 726/7 |
| 6,611,915 B1 | 8/2003 | Kubik et al. | 713/200 |
| 6,625,641 B1 | 9/2003 | Hare et al. | 709/203 |
| 6,697,846 B1 | 2/2004 | Soltis | 709/217 |
| 6,779,063 B2 | 8/2004 | Yamamoto | 710/74 |
| 6,922,757 B2 | 7/2005 | Frank et al. | 711/147 |
| 6,944,690 B2 | 9/2005 | Yamamoto | 710/74 |
| 6,976,058 B1 * | 12/2005 | Brown et al. | 709/217 |
| 7,246,200 B1 * | 7/2007 | van Rietschote et al. | 711/114 |
| 7,426,571 B2 * | 9/2008 | Chadalavada | 709/235 |
| 2004/0093389 A1 * | 5/2004 | Mohamed et al. | 709/212 |
| 2004/0199758 A1 * | 10/2004 | Meaney et al. | 713/2 |
| 2004/0255000 A1 * | 12/2004 | Simionescu et al. | 709/208 |

OTHER PUBLICATIONS

Bell et al. "Remote Systems Management Using the Dell Remote Access Card." [Retrieved online on Feb. 23, 2009] May 2002. [Retreived from the Internet] <URL: http://www.dell.com/content/topics/global.aspx/power/en/ps2q02_bell>.*

Dumitru, Aurelian. "DRAC III Remote Floppy Boot." [Retreived from eDAN on Feb. 23, 2009] Apr. 2002. [Retreived from the file for U.S. Appl. No. 11/234,412].*

T. Ylonen et al. "The Secure Shell (SSH) Protocol Architecture." [Retrieved online on Feb. 23, 2009] Jan. 2006. [Retreived from the Internet] <URL: http://www.ietf.org/rfc/rfc4251.txt>.*

J. Postel et al. "Telnet Protocol Specification." [Retrieved online on Feb. 23, 2009] May 1983. [Retreived from the Internet] <URL: http://www.isi.edu/in-notes/rfc854.txt>.*

(Continued)

*Primary Examiner* — Wen-Tai Lin
(74) *Attorney, Agent, or Firm* — Baker Botts L.L.P.

(57) ABSTRACT

A remote management card is associated with a server and connected to a Network File System (NFS) server storing files. The remote management card is configured to locate a file or image on a network. The associated server my then access the files on the NFS server, facilitating the installation of an operating system or accessing another desired file.

10 Claims, 2 Drawing Sheets

(56) References Cited

OTHER PUBLICATIONS

Microsoft Corporation. "Microsoft Computer Dictionary, Fifth Edition." Copyright 2002. Front cover, Copywrite page and p. 348; 3 pages total.*

Digital Software. "Maintance Operation Protocol Functional Specification (MOP)." [Retreived online on May 13, 2010] Oct. 1980. [Retreived from the Internet] <URL:http://decnet.ipv7.net/docs/dundas/aa-k178a-tk.pdf>.*

Digital Equipment Corporation. "PCSA: DEPCA Hardware Reference Manual." [Retrieved from the Internet on Dec. 14, 2010] Published Apr. 1989. <URL: http://www.bitsavers.org/pdf/dec/ethernet/EK-DEPCA-PR-001_Apr89.pdf>.*

Bill Nowicki; "Network File System Protocol Specification"; Request for Comments: 1094; Sun Microsystems, Inc.; www.ietf.org ; pp. 26, Mar. 1989.

B. Callaghan et al.; "NFS Version 3 Protocol Specification"; Request for Comments: 1813; Sun Microsystems, Inc.; www.ietf.org ; pp. 118, Jun. 1995.

S. Bradner, editor; "An Agreement Between the Internet Society, the IETF, and Sun Microsystems, Inc. in the Matter of NFS V.4 Protocols"; Request for Comments: 2339; Sun Microsystems; www.ietf.org ; pp. 5, May 1998.

M. Eisler; "NFS Version 2 and Version 3 Security Issues and the NFS Protocol's Use of RPCSEC_GSS and Kerberos V5"; Request for Comments: 2623; Sun Microsystems; www.ietf.org ; pp. 18, Jun. 1999.

S. Shepler et al.; "NFS Version 4 Protocol"; Request for Comments: 3010; Sun Microsystems; www.ietf.org ; pp. 212, Dec. 2000.

S. Shepler et al.; "Network File System (NFS) Version 4 Protocol"; Request for Comments: 3530; Sun Microsystems; www.ietf.org ; pp. 275, Apr. 2003.

* cited by examiner

SYSTEM AND METHOD FOR USING A NETWORK FILE SYSTEM MOUNT FROM A REMOTE MANAGEMENT CARD

TECHNICAL FIELD

The present invention is related to the field of computer systems and more specifically to a system and method for utilizing a Network File System mount from a remote management card to access an image on a Network File System server.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems may utilize remote management cards to manage communications with other computing resources. Remote management cards may incorporate so-called virtual media to allow a user to access files stored on another server or component. However, remote management cards typically require an associated server to include a browser and other server side software in order to access the virtual media. Currently available systems are generally user directed, requiring a user or administrator to initiate a connection with the remote management card and initiate the access to the virtual media. Present systems and methods for accessing virtual media present several drawbacks as they require user or administrator involvement. When managing multiple servers, requiring a remote administrator to initiate the access of the virtual media can require a significant amount of administrator time which may disadvantageously limit the utilization of virtual media.

SUMMARY OF THE INVENTION

Wherefore a need has arisen for an automated system and method of utilizing virtual media without the presence of a remote administrator.

The present disclosure provides a remote management card configured to locate a file or image on a network, thereby allowing the installation of an operating system or another file by configuring the remote management card once and not requiring a browser or client side plug-in application to be installed on the associated server.

In one aspect, an information handling system is disclosed that includes a first server associated with a first remote management card. A Network File System (NFS) server is in communication with the first server and has one or more selected files stored thereon. A remote management card is configured to store the network address of the NFS server as well as a mount point associated with the selected file or files. The remote management card is also configured to automatically locate the selected file from the NFS server using the network address and the mount point and allow the first server to access the selected file.

In another aspect, a remote management card is disclosed that includes a NFS server network address field and a mount field. The NFS server network address field is configured to store a network address of an associated NFS server. The mount field is configured to store a mount point associated with a selected file stored in the NFS server. The remote management card also includes an installation module that is configured to automatically locate the selected file from the NFS server using the network address and mount point and to make the selected file available to an associated server.

In another aspect a method for accessing a selected file is disclosed that includes logging into a remote management card from a remote administration node and setting a network file system server address within the remote management card. The method also includes setting a mount point within the NFS server corresponding to a select file. The method also includes establishing a mount with the selected mount point using the remote management card and providing the selected file to a server associated with the remote management card.

The present disclosure includes a number of important technical advantages. One important technical advantage is the use of a mount point and NFS server address with a remote management card. Use of the NFS server address and mount point allows a remote management card to automatically provide access to a selected file stored within a NFS server and accessed by an associated server without requiring a remote administrator and also without requiring a browser or other software to be installed on the associated server. Additional advantages will be evident to those of skill in the art upon review of the specification, figures and claims below.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
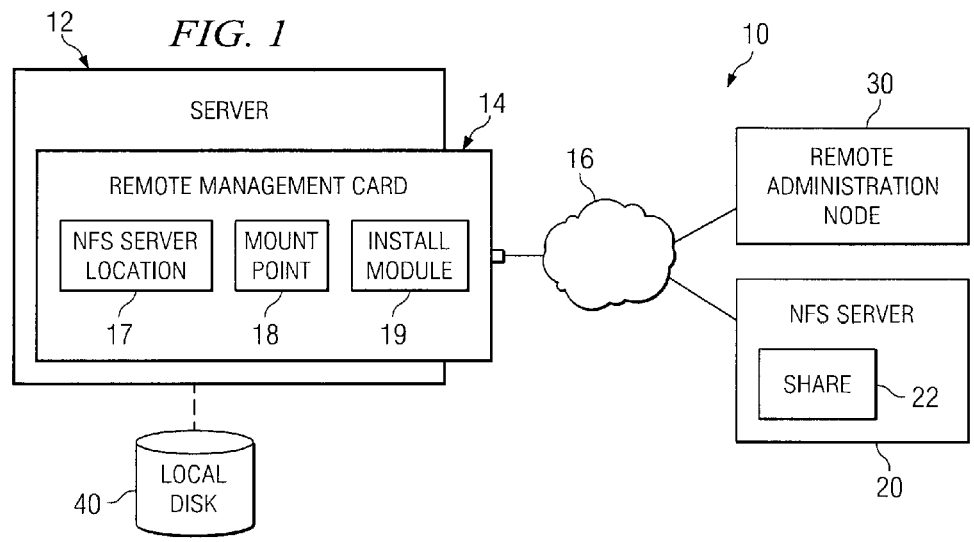
FIG. 1 shows a server and remote management card for accessing an NFS server in accordance with the teachings of the present disclosure.
Figure 3:
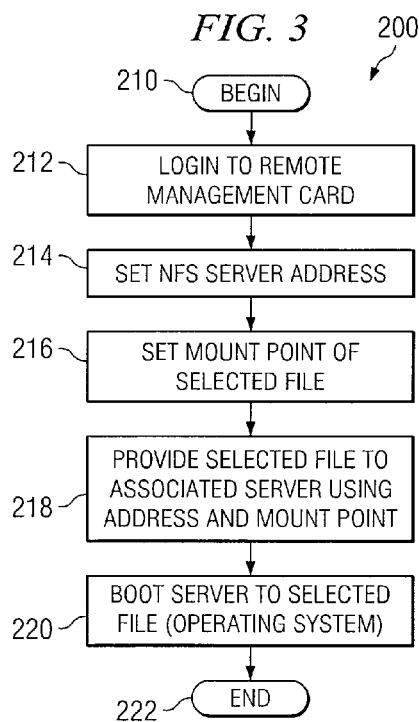
FIG. 3 is a flow diagram showing a method according to the teachings of the present disclosure.
Figure 2:
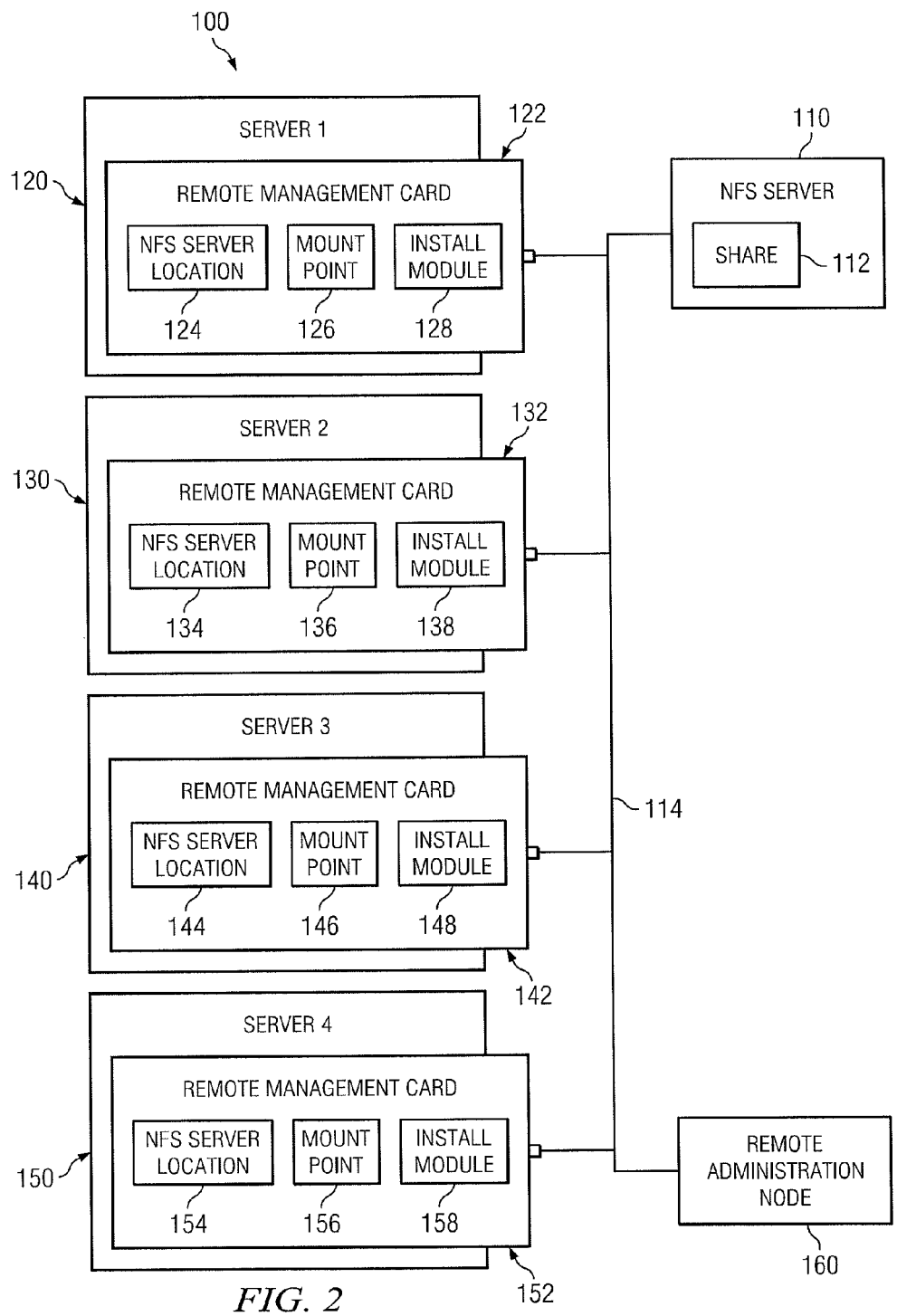
FIG. 2 shows a multiple server system utilizing remote management cards to access files on a NFS server in accordance with the teachings of the present disclosure.

Preferred embodiments of the invention and its advantages are best understood by reference to FIGS. 1-3 wherein like numbers refer to like and corresponding parts and like element names to like and corresponding elements.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Now referring to FIG. 1 the information handling system indicated generally at 10 is shown. Information handling system 10 generally includes first server 12 in communication with Network File System (NFS) server 20 and remote administration node 30 interconnected by network 16. First server 12 my comprise any system that may require the installation of operating system files or images as discussed herein. Server 12 includes a remote management card 14 associated therewith. Remote management card 14 also includes NFS server location field 17, mount point 18 and installation module 19. NFS server 20 includes share 22 for storing selected files such as operating system files and other/or applications. NFS server 20 is preferably compatible with NFS protocol versions 2, 3 and 4 (RFC1094, RFC1813, RFC2339, RFC2623, RFC3010, and RFC3530) which are hereby incorporated by reference. NFS server 20 includes share 22 for storing one or more selected files.

Remote administration node 30 is operatively connected with network 16 and NFS server 20, allowing administrator or other user to communicate with server 12 (via remote management card 14), as well as with NFS server 20. In one embodiment remote administration node 30 may communicate with remote management card 14 using a telnet protocol, a Secure Socket Shell (SSH) protocol or another suitable communication protocol.

Remote management card 14 may also be referred to as a remote access card. A remote management card may be any suitable remote management card such as, for example, a Dell Remote Access Card 5 (DRAC5). Remote management card 14 is preferably configured to included NFS server location 17, mount point 18 and installation module 19.

Remote administration node 30 configures the remote management card to mount to mount point 18 over the NFS server 20 with the share 22. Remote administration node 30 may also assign share 22 to server 20. NFS server location field 17 is preferably configured to store the network address of NFS server 20. Mount point field 18 is preferably configured to store a mount point associated with one or more selected files stored within NFS server 20. In one embodiment, mount point 18 preferably includes the mount point for establishing a connection with share 22 within NFS server 20 and the file or files contained therein.

As discussed herein NFS server location field 17, mount point 18 and installation module 19 may represent any suitable hardware or software including executable controlling logic for providing the functionality discussed herein.

In operation, remote administration node 30 may allow a user (such as an administrator) to access remote management card 14 via network 16. In an example embodiment, remote administration node 30 may communicate with remote management card 14 via, for instance, a telnet communication protocol, a secure socket show (SSH)communication protocol or any other suitable protocol. Remote administration node 30 may preferably set location information such as the network address of NFS server 20 for inclusion within NFS server location 17. Additionally, remote administration node 30 may also set mount point information within mount point 18 that corresponds with a mount point for share 22 within NFS server 20. Subsequently, remote management card 14 may automatically initiate locating one or more selected files stored within NFS server 20 and share 22, and provide access to such files to server 12. This process may also be referred to as presenting the selected file or files as a virtual media to server 12. In some embodiments, share 22 may be used by multiple associated remote management cards.

Remote management card 14 preferably accesses or provides server 12 with access to NFS server 20 utilizing information stored within NFS server location 17 and accesses share 22 using mount point 18. Remote management card 14 may then preferably access a selected file within share 22 and provide access to that file to first server 12. In a particular embodiment, remote management card 14 presents the selected file or files within share 22 to first server 12 as if the files were available within a local disk such as a local disk 40. Additionally, remote management card 14 may preferably access NFS server 20 and share 22 without requiring the connection of remote administration node 30 and without immediate input from an administrator or user.

In a particular embodiment, the selected files within share 22 may include a selected operating system, and server 12 may boot to the operating system within share 22.

Now referring to FIG. 2, an information handling system, indicated generally at 100, is shown. Information handling system 100, includes NFS server 110 connected with first server 120, second server 130, third server 140 and fourth server 150 via network 114. Additionally, remote administration node 110 is connected with servers 120, 130, 140 and 150 as well as NFS server 110 via network 114.

First server 120 includes remote management card 122 associated therewith. Remote management card 122 includes NFS server location block 124, mount point block 126 and installation module 128. Second server 130 includes remote management card 132. Remote management card 132 is configured to include NFS server location block 134, mount point block 136 and installation module 138. Third server 140 includes remote management card 142. Remote management card 142 is configured to include NFS server location block 144, mount point block 146 and installation module 148. Fourth server 150 includes remote management card 152. Remote management card 152 is configured to include NFS server location block 154, mount point block 156 and installation module 158. NFS server location blocks 124, 134, 144 and 154 operate analogously to NFS server location block 17 described above. Mount point blocks 126, 136, 146 and 156 operate analogously to mount point block 18 described above. Installation modules 128, 138, 148 and 158 operate.

In the present embodiment remote administrative node 160 may access any of remote management cards 122, 132, 142 and/or 152 and set address and mount point information in their respective NFS server location and mount point fields or blocks. Remote administration node 160 may communicate with each of remote management cards 122, 132, 142 and 152 and update NFS server location or mount point data thereon. In some applications, remote administration node 160 may provide uniform NFS server location and mount point information to remote management cards 122, 132, 142 and 152.

In other applications, remote administration node 160 may access one or more selected remote management cards and set selected NFS server location or mount point data corresponding to selected files or applications. In the present embodiment four servers 120, 130, 140 and 150 are in communication with network 114; in alternate embodiments, more or fewer servers (and their respective remote management cards) may be incorporated in the system disclosed herein. NFS server 110 and share 112 are accessible to any of remote management card 122, 132, 142 and 152. Each remote management card 122, 132, 142 and 152 may access files stored within share 112 of NFS server 110. In a particular embodiment share 112 may include an operating system and each remote management card 122, 132, 142, and 152 may provide access thereto, allowing its respective server to boot to the operating system. In another embodiment share 112 may include any other suitable file for providing to any of the servers via a NFS server 110. In the present embodiment only a single NFS server 110 and a single share 112 is shown; in alternate embodiments, multiple NFS servers and multiple shares may be used in accordance with the teachings of the present disclosure.

Now referring to FIG. 3, a flow diagram 200 showing a method according to the present disclosure is shown. The method begins 210 by first logging into a remote management card 212. This login may preferably take place from a remote administration node or device (such as remote administration node 30 shown in FIG. 1). Next, an NFS server address is set within a remote management card 214. Next, a mount point corresponding to a selected file stored on the NFS server is set within the mount point field of a remote management card 216. As shown in FIG. 1, NFS server location field block 17 and mount point field block 18 are shown as residing within remote management card 14. However, the present disclosure contemplates that NFS server location block 17 and mount point block 18 may reside in any suitable memory resource accessible to remote management card 14.

The method continues by providing a selected file to an associated server (such as server 12) using the address and mount point data 218. Mount point data may be used to access a single file or multiple files. Next the associated server accesses the selected file 220. In a preferred embodiment, the selected file comprises an operating system to which the associated server may boot. However, in alternate embodiments, the selected file stored within network file system server may comprise any suitable file or software application. Method 200 may end at step 222.

Although the disclosed embodiments have been described in detail, it should be understood that various changes, substitutions and alterations can be made to the embodiments without departing from their spirit and scope.

What is claimed is:

1. An information handling system comprising:
a first server having a first remote management card associated therewith;
a Network File System (NFS) server remotely located from the first server and in communication with the first server via a network, the NFS server having at least one selected file stored thereon, the selected file including an operating system;
the remote management card configured to:
receive a network address of the NFS and a mount point associated with the at least one selected file from a remote administration node in communication with the first server;
store the network address of the NFS server and the mount point associated with the at least one selected file;
automatically access the at least one selected file stored on the NFS server via the network using the network address and the mount point; and
boot the first server to the at least one selected file, the at least one selected file presented from the NFS to the first server as if the at least one selected file was available within a local disk of the first server;
wherein use of the NFS server address and the mount point allows the remote management card to automatically provide access to the selected file stored within the NFS server and accessed by the first server without requiring a connection to the remote administration node and also without requiring a browsing software to be installed on the first server.

2. The information handling system of claim 1 further comprising:
a plurality of servers, each server having a remote management card associated therewith, each remote management card in communication with the NFS server via the network;
each remote management card configured to store a NFS client identifying the network address of the NFS server and the mount point associated with the at least one selected file; and
each remote management card configured to automatically access the at least one selected file stored on the NFS server via the network using the network address and the mount point, and provide the associated server access to the at least one selected file.

3. The information handling system of claim 1, wherein the administration node is operable to access the remote management card and adjust the network address and the mount point.

4. The information handling system of claim 1 wherein the remote management card is configured to communicate with the remote administration node via a Telnet communication protocol.

5. The information handling system of claim 1 wherein the remote management card is configured to communicate with the remote administration node via a Secure Socket Shell (SSH) communication protocol.

6. The information handling system of claim 1 wherein the at least one selected file is stored in a particular share within the NFS server.

7. A remote management card comprising:
a Network File System (NFS) server network address field configured to store the network address of an associated NFS server remotely located from the remote management card;
a mount field configured to store a mount point associated with a selected file stored on the NFS server, the selected file including an operating system; and
an installation module configured to locate the selected file stored on the NFS server using the network address and mount point and boot an associated server to the selected file, the selected file presented from the NFS to the associated server as if the selected file was available within a local disk of the associated server;
wherein the remote management card is configured to:
receive a network address setting and a mount point setting from an associated remote administration node;

automatically access the selected file stored on the NFS server via a network using the network address and the mount point; and wherein use of the NFS server address and the mount point allows the remote management card to automatically provide access to the selected file stored within the NFS server and accessed by the first server without requiring a connection to the remote administration node and also without requiring a browsing software to be installed on the first server.

8. The remote management card of claim 7, wherein the remote management card is configured to communicate with the remote administration node via a Telnet communication protocol.

9. The remote management card of claim 7, wherein the remote management card is configured to communicate with the remote administration node via a Secure Socket Shell (SSH) communication protocol.

10. The remote management card of claim 7, wherein the at least one selected file is stored in a particular share within the NFS server.

\* \* \* \* \*